United States Patent [19]
Fersht et al.

[11] Patent Number: 6,064,630
[45] Date of Patent: *May 16, 2000

[54] SENSOR WITH AN OPTICAL INTERFEROMETRIC PICK-OFF

[75] Inventors: Samuel N. Fersht, Studio City; David B. Hall, La Crescenta, both of Calif.

[73] Assignee: Litton Systems, Inc., Woodland Hills, Calif.

[*] Notice: This patent is subject to a terminal disclaimer.

[21] Appl. No.: 09/114,583

[22] Filed: Jul. 13, 1998

Related U.S. Application Data

[63] Continuation-in-part of application No. 08/848,090, Jun. 6, 1997, Pat. No. 5,949,740.

[51] Int. Cl.[7] .................................................. H04R 1/44
[52] U.S. Cl. ........................................................ 367/149
[58] Field of Search ....................... 367/149; 250/277.14, 250/227.27; 385/12, 13; 356/345; 73/514.12, 514.13, 514.18, 514.26; 361/280, 283.1, 287

[56] References Cited

U.S. PATENT DOCUMENTS

| | | | |
|---|---|---|---|
| 4,446,543 | 5/1984 | McLandrich et al. | 367/149 |
| 4,799,797 | 1/1989 | Huggins | 356/345 |
| 5,218,420 | 6/1993 | Asmar | 73/514.26 |
| 5,448,058 | 9/1995 | Arab-Sadeghabadi et al. | 250/225 |
| 5,503,285 | 4/1996 | Warren | 216/2 |
| 5,529,671 | 6/1996 | Debley et al. | 204/192 |
| 5,675,415 | 10/1997 | Akatsu et al. | 356/345 |
| 5,949,740 | 9/1999 | Hall | 367/149 |

FOREIGN PATENT DOCUMENTS

| | | |
|---|---|---|
| 86301450 | 2/1986 | European Pat. Off. . |
| 63-65160 | 3/1988 | Japan . |
| 64-123937 | 5/1989 | Japan . |
| 4-211430 | 8/1992 | Japan . |
| 06051787 | 3/1994 | Japan . |
| 07181765 | 7/1995 | Japan . |

*Primary Examiner*—Daniel T. Pihulic
*Attorney, Agent, or Firm*—Paul Y. Feng; Fulwider Patton Lee & Utecht, LLP

[57] ABSTRACT

A system for measuring changes in an environmental parameter such as displacement, velocity, acceleration, or pressure, includes a laser for providing a pulsed, coherent light signal, and an interferometer having a first and second optical legs of unequal optical path lengths. The signal is split into first and second beams that are directed into the first and second optical legs. Either a fixed mirror disposed on a frame or a moving mirror on one side of the proof mass reflects the first beam received at the end of the first optical leg. The frame also suspends a proof mass at opposite ends. An optical pick-off embodied in a movable mirror formed on the proof mass reflects the second beam received from the end of the second optical leg. The proof mass with mirror moves in response to changes in the value of the parameter to be measured. An optical coupler combines the first and second beams after they have been reflected back into their respective optical legs, producing an interference signal, which is detected by an optical detector. The detector generates an electronic signal, which is analyzed in a microcomputer. To compensate for gravity, the proof mass has an asymmetrical profile. As a velocity sensor for seismic measurements, its construction is guided by the mass of the proof mass and spring stiffness of the hinges. Represented mathematically, those terms are selected to minimize the acceleration and displacement components, leaving only the velocity component as a function of the ratio of mass to damping coefficients.

30 Claims, 5 Drawing Sheets

SENSOR WITH AN OPTICAL INTERFEROMETRIC PICK-OFF

This is a continuation-in-part of copending application Ser. No. 08/848,090, now U.S. Pat. No. 5,949,740, filed on Jun. 6, 1997, entitled "An Unbalanced Fiber Optic Michelson Interferometer As An Optical Pick-Off," whose entire contents are hereby incorporated by reference.

BACKGROUND OF THE INVENTION

1. Field of the Invention

The present invention relates to optical sensors used to measure environmental changes such as pressure, displacement, velocity, or acceleration. More precisely, the present invention is directed to an optical pick-off as part of an interferometer used to measure pressure, seismic wave particle displacement, velocity, or acceleration.

2. Description of Related Art

Michelson or Mach-Zehnder interferometers have been known for use in certain applications such as acoustic sensors. A description of a Mach-Zehnder interferometer used in an underwater acoustic sensor is contained in, for example, U.S. Pat. No. 5,448,058 to Arab-Sadeghabadi et al.

A conventional, optical interferometer includes a pair of optical fibers into which a single source of light directs a light signal. The light signals, guided respectively through the two fibers, follow optical paths of different lengths, producing a phase difference between the two signal beams when the beams are combined. The combined beams may be detected by an optical detector. If the two signal beams have the same polarization state when they are combined, the signals interfere to form a fringe pattern, of bright and dark lines, that is detected by the optical detector.

Exposing either or both of the fibers to a change in the environmental parameters, such as an acoustic pressure change, changes the fringe pattern that is incident on the optical detector. Such changes in the fringe pattern as detected by the optical detector may be analyzed to measure the changes in the environmental parameters to which the fiber has been exposed. In this manner, the nature of the acoustic waves to which the fiber is exposed may be determined when the interferometer is used in an acoustic sensor.

Mach-Zehnder or Michelson interferometers employed in underwater acoustic sensor systems (known in the art as a hydrophone) use tens of meters of optical fiber wrapped on a mandrel. The fiber is stretched, contracted, or both, to produce a measured phase delay that is proportional to the pressure environment resulting from acoustic waves. The interferometer has an optical path length mismatch between its two optical legs that is on the order of one meter, to allow the standard functioning and signal processing with a phase-generated carrier. See, for example, Kersey, "Distributed and Multiplexed Fiber Optic Sensors", in Udd, Ed., *Fiber Optic Sensors: An Introduction for Engineers and Scientists*, (New York, 1991), pp. 347–363.

Fiber optic interferometric sensor systems of the types described above have found favor over piezoelectric hydrophone systems due to such advantages as immunity to electromagnetic interference (EMI); the ability to locate all electronic and electrical components and systems in the towing vessel rather than in the underwater environment; and the ability to measure vector quantities. The prior art fiber optic sensor systems, however, are relatively expensive to manufacture, so less expensive alternatives that provide the same advantages over piezoelectric systems have been sought. Batch-processed silicon chip sensors, having a proof mass that is moved in response to vehicle or medium motion have been employed as accelerometers. Such silicon sensors are relatively inexpensive and quite rugged. Use of such silicon sensors in a seismic or acoustic system, with the proof mass accessed by a fiber optic delivery system, would lower costs as compared with prior art fiber optic systems. Making such chip sensors compatible with existing fiber optic architectures in Mach-Zehnder and Michelson interferometric sensing systems and the like has, however, proved troublesome in practice.

It would therefore be a significant advancement in the state of the art to provide a fiber optic interferometric sensor system, in a seismic or like application, that is capable of employing batch-processed silicon sensors.

SUMMARY OF THE INVENTION

The present invention is directed to a measuring system that uses an inexpensive silicon chip sensor with an optical interferometric pick-off to measure displacement, velocity, acceleration, or other environmental attributes or parameters. In a preferred embodiment, the sensor includes a movable proof mass that is used to move one or two mirrors at the end of one or two legs of an interferometer having two unequal length legs. The proof mass of the silicon chip sensor moves in response to the acceleration experienced by its housing, changing the optical length of one or both legs of the interferometer.

The present invention includes an optical signal source for providing a pulsed, coherent light signal, and an interferometer having first and second fiber optic legs of unequal optical path length. The signal is split into first and second beams that are respectively directed into the first and second fiber optic legs. In the event of using only one measuring leg, a fixed end mirror is placed on the end of the first of the fiber optic legs for reflecting the first beam received at the end of the first fiber optic leg. An optical pick-off is fixed beyond the end of the second of the fiber optic legs. The optical pick-off comprises a proof mass that is movable relative to the end of the second fiber optic leg. The surface of the proof mass is reflective and positioned to reflect the second beam received from the end of the second fiber leg. An optical coupler combines the first and second beams reflected from the fixed end mirror and the proof mass, producing an interference signal. An optical detector optically coupled to the coupler detects the interference signal of the combined beams and generates an electronic signal having a value indicative of the value of the interference signal. The electronic signal is analyzed to correlate its value to changes in the value of the environmental parameter to be measured.

In an alternative embodiment, the construction is similar to the above described exemplary embodiment, except here the optical pick-off comprises a movable proof mass having mirrored surfaces on both sides, and the first fiber optic leg terminates on one side while the second optical leg terminates on the opposite side. In this embodiment, both optical legs are active.

The measuring system of the present invention provides an accurate, relatively low-cost fiber optic interferometric sensor system, in acoustic, seismic, or like application, that employs batch-processed silicon sensors. Also, the present invention is completely compatible with existing fiber optic architectures of telemetric systems.

BRIEF DESCRIPTION OF THE DRAWINGS

The objects, features, and advantages of the present invention will be apparent to one skilled in the art from reading the following description in which.

DETAILED DESCRIPTION OF THE PREFERRED EMBODIMENTS

Figure 1:
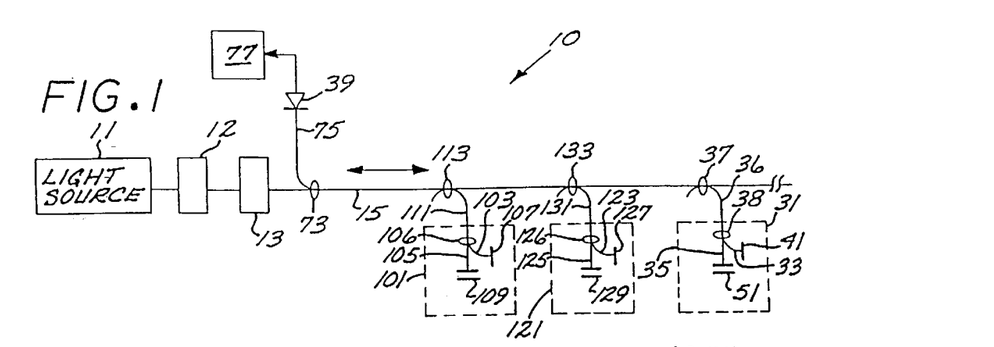
FIG. 1 is a schematic showing a preferred embodiment measuring device constructed according to the present invention incorporating several interferometers.

The present invention is now described in the context of its preferred embodiments. Measuring system 10, constructed according to the present invention, is illustrated in FIG. 1. Measuring system 10 comprises one or more interferometers that measure changes in the interference patterns in light reflected from the ends of optical fiber paths having unequal lengths.

Specifically, measuring system 10 includes light source 11, which is preferably a laser producing an optical signal of coherent light in the infrared or visible spectrum. Light source 11 may be directly pulsed, or it may be energized continuously, with its signal being pulsed by a lithium niobate amplitude modulator 12, operated as an optical gate, or by an equivalent mechanism. The pulsed signal is then fiber-optically transmitted to phase modulator 13, which creates a phase-generated carrier at a selected carrier frequency.

The pulsed and phase-modulated signal is propagated in a first direction through optical fiber transmission line 15 to a single interferometer or a plurality of interferometers in series along transmission line 15. In the illustrated embodiment, three interferometers 31, 101, 121 are shown, for purposes to be described below. For the purposes of the instant discussion, only the first interferometer 31 is described.

In the exemplary embodiment, first interferometer 31 is optically coupled to transmission line 15 by fiber optic down-link 36 and first optical coupler 37. First interferometer 31 comprises a pair of preferably unequal length optical fiber legs 33, 35. The optical signal propagating through transmission line 15 in the first direction from light source 11 is split into two interrogation beams by second optical coupler 38. The second optical coupler 38, which may be a conventional 3 dB optical coupler, directs a first beam into first optical leg 33, and a second beam into second optical leg 35.

The optical path length of second optical leg 35 is substantially greater than the optical path length of first optical leg 33. For example, the optical path length of first optical leg 33 is as short as possible, preferably no more than about 10 centimeters in length. The optical path length of second optical leg 35 may be as short as about one meter in length.

As is explained in detail below, the first and second beams are reflected at the ends of first and second optical fiber legs 33, 35, respectively, returning through the optical legs to second optical coupler 38, which recombines the reflected light signals for return propagation along transmission line 15 in a second direction to photo detector 39. Changes in the relative optical path lengths between the two legs cause changes in the interference patterns in the reflected light when it returns to transmission line 15. As described below, and recognized by those skilled in the art, the analyses of that interference pattern and of the changes to it permit changes in the environmental parameters to which interferometer 31 is exposed (such as pressure and motion) to be determined.

First optical fiber leg 33 (the shorter leg) has a normal, high reflectivity end mirror 41 fixed at its remote end. Fixed end mirror 41 reflects the first beam propagated through first optical leg 33 back into first optical leg 33 in the opposite direction, toward light source 11 and toward detector 39. Importantly, fixed end mirror 41 of first optical fiber leg 33 may optionally be located on an immobile housing or frame (not shown).

At the remote or second end of second fiber leg 35, optical pick-off 51 of the type described in detail below includes a silicon sensor chip containing a movable proof mass. The proof mass provides a movable end mirror that reflects the second beam propagated through second optical leg 35 back into second optical leg 35 in the opposite direction, toward light source 11 and detector 39.

The system shown in FIG. 1 is a time division multiplexing (TDM) system. Those skilled in the pertinent arts will recognize that the present invention may be employed in a frequency division multiplexing (FDM) system, and the modifications of the system shown in FIG. 1 needed to employ the invention in an FDM system would be within the skill of such practitioners.

Figure 2A:
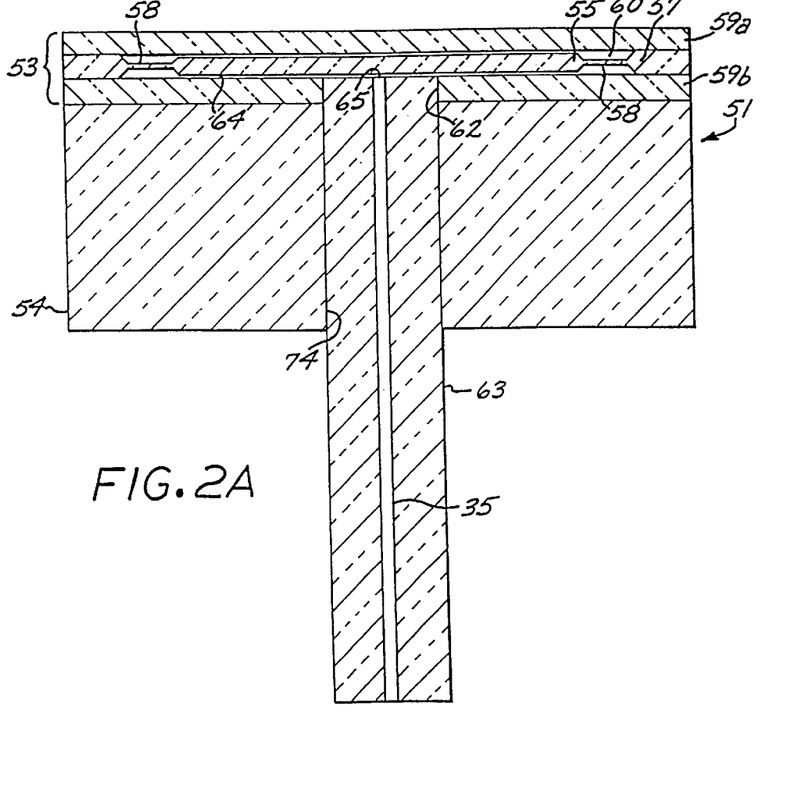
FIG. 2A is a cross-sectional view of an exemplary embodiment of a silicon sensor chip containing a proof mass of the type that may be employed as a velocity sensor, and one embodiment of a supporting block for holding the sensor chip and the end portion of the optical fiber in an optical pick-off constructed according to the invention.
Figure 2B:
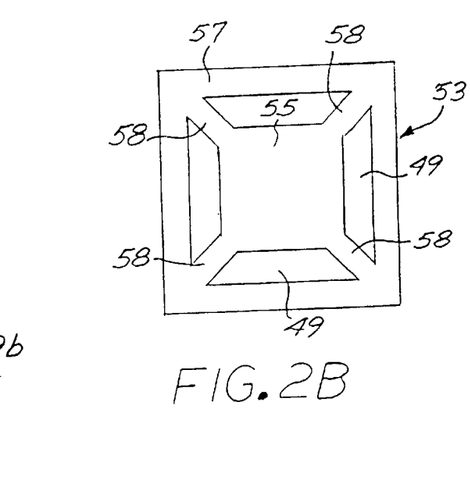
FIG. 2B is a top plan view showing a preferred embodiment construction of the proof mass, supporting hinges, and frame of the present invention silicon chip.

FIG. 2A is a cross-sectional view of a preferred embodiment of a single silicon chip sensor 53 that includes a movable proof mass 55. FIG. 2B shows the general preferred configuration of a 9 mm by 9 mm proof mass 55 supported at the corners by hinges 58 attached to a frame or peripheral mounting portion 57. Each hinge 58 has a width of approximately 500 microns. Peripheral mounting portion 57 has a length and width of approximately 12.5 mm by 12.5 mm. Proof mass 55 is separated from peripheral mounting portion 57 by gap 49 of approximately 100 microns. Needless to say, the shapes and sizes of proof mass 55, gap 49, and peripheral mounting portion 57 are exemplary, as are the number and attachment sites for hinges 58. Such a configuration is needed to prevent proof mass 55 from distorting or undergoing a cantilevered motion, which would cause the optical signal reflected off the surface of proof mass 55 to stray off the mark. The present invention sensor 53 operates with proof mass 55 suspended in a fluid such as, for example, nitrogen or ambient air.

As best seen in FIG. 2A, optical pick-off 51 incorporates silicon chip sensor 53 mounted on pick-off support block 54. Silicon chip sensors suitable for the present invention are known in the art and are readily available, although each sensor typically has its own configuration and might be custom designed. They are relatively inexpensive, and may be manufactured in large quantities. Silicon chip sensors use a movable proof mass to sense dynamic changes in the environment, such as medium particle displacement velocity, acceleration, or changes in pressure.

Figure 2C:
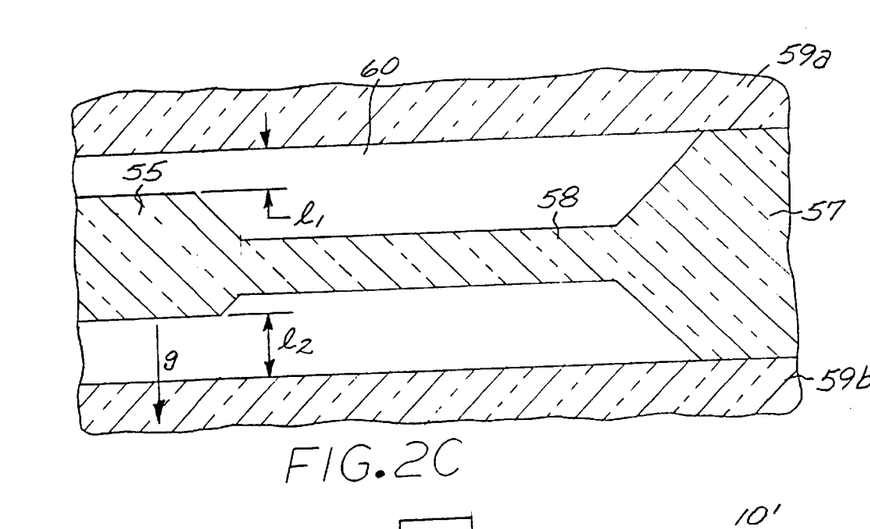
FIG. 2C is a magnified sectional view showing an asymmetrical proof mass designed to compensate for gravity.

To compensate for the effect of gravity on proof mass 55, the present invention in a preferred embodiment incorporates asymmetry into the profile of proof mass 55. This is best seen in the enlarged detailed view of FIG. 2C, showing proof mass 55 supported by hinge 58 on frame or peripheral mounting portion 57. The effect of gravity on proof mass 55 is represented by downward arrow g. To compensate for gravity, proof mass 55 has an asymmetry on either side of hinge 58, resulting in unequal distances $1_1$ and $1_2$. Prior to the effect of gravity, as depicted in FIG. 2C, $1_1$ is less than $1_2$ so that with the effect of gravity, proof mass 55 shifts downward so that $1_1$ is equal to $1_2$. Gravity must be considered because the present invention is small. To be sure, the gaps, represented by $1_1$ and $1_2$ should ideally be equal within a few microns for a push-pull system, described in detail below.

As mentioned above, FIG. 2A shows an exemplary embodiment silicon chip sensor 53 having an optical pick-off. Chip sensor 53 includes an integral silicon element comprising movable proof mass 55 attached to peripheral mounting portion 57 by means of hinges or flexible connecting portions 58 along at least two opposed edges of proof mass 55. Mounting portion 57 is securely fixed between first housing portion 59a and second housing portion 59b, which define between them internal housing cavity 60 that contains proof mass 55. Housing portions 59a, 59b advantageously comprise plates of a ceramic material having a silicon compatible coefficient of thermal expansion to minimize pre-stressing at operating temperatures. Such materials include, preferably, PYREX® glass (marketed by Corning Glass, Corning, N.Y.), silicon, or an equivalent material known in the art.

Proof mass 55 must be able to move within cavity 60 in response to changes in environmental motion. In the exemplary embodiment, second housing portion 59b includes opening 62, approximately aligned with the center of proof mass 55, through which the second optical beam is directed to proof mass 55.

As mentioned above, flexible connecting portions 58 or hinges are preferably located at opposed edges of proof mass 55; proof mass 55 is thus suspended at opposite ends. This is needed to ensure that proof mass 55 when displaced does not tilt relative to the incoming second optical beam in a cantilevered fashion. If proof mass 55 tilts when displaced, the second optical beam reflected off the movable end mirror becomes askew and the signal for second optical leg 35 may be lost.

The remote end portion of second optical fiber leg 35 may be contained in ferrule 63, which is preferably a ceramic tube. An axial passage through ferrule 63 holds the remote end portion of second optical fiber leg 35, and is essentially the same diameter as the diameter of optical fiber 35. The remote end of ferrule 63, with the remote end portion of second optical fiber leg 35 contained therein, is inserted into opening 62 in second housing portion 59b of silicon sensor 53. A movable end mirror on the proof mass 55 is provided by a highly reflective surface 64 that is spaced from and opposed to end surface 65 of second optical fiber leg 35 that lies substantially flush with the end surface of ferrule 63 within opening 62. Preferably, this reflective surface 64 is provided by a thin metallic coating, such as gold, to provide a reflectivity close to 100 percent. Thus the light beam from fiber 35 passes through air only as it exits end face 65 of the fiber, is reflected by surface 64 of the proof mass, and returns to the fiber. The light does not travel through other materials that may distort the beam.

The gap between end surface 65 of fiber 35 and reflective surface 64 of proof mass 55 should be sufficiently small that there is minimal optical loss from beam spreading as the light exits the end of the fiber and is reflected back into the fiber. Preferably, the gap width is equal to at most a few wavelengths of the light propagating through the fiber. For example, for wavelengths of interest, the gap width would preferably be between about 2.5 microns and about 20 microns so that the "round trip" distance the light travels in air is in the range of about 5 to about 40 microns. End surface 65 of second fiber leg 35 is coated with an anti-reflective coating (not shown) to minimize unwanted etalon reflections between proof mass 55 and fiber end surface 65, and to ensure that all of the reflected signal enters the fiber. Also, the anti-reflective coating is needed to substantially eliminate retro-reflection back into second optical fiber leg 35. The anti-reflective coating on end surface 65 should have a reflectivity that is preferably no more than about 0.1 percent. The fabrication of optical coatings with such a low degree of reflectivity is known in the art, as shown, for example, in U.S. Pat. No. 5,529,671 to Debley et al., the disclosure of which is incorporated herein by reference.

Sensor 53 is mounted on support block 54 so that opening 62 in second housing portion 59b coincides with axial bore 74 in support block 54. Axial bore 74 receives ferrule 63. The sensor 53 is bonded to the support block 54 by an epoxy adhesive, preferably one that is ultraviolet-cured. The remaining length of second fiber leg 35 outside ferrule 63 may be contained within a typical fiber jacket (not shown), as is well known in the art. Pick-off support block 54 may be annular, although the specific configuration and dimensions are matters of design choice to suit the particular application of concern.

Thus, the second optical beam passing through second optical fiber leg 35 emerges from end surface 65 of the fiber, and passes through the air gap between fiber end surface 65 and reflective surface 64 of the moving proof mass 55. Reflective surface 64 reflects the light beam back into second optical fiber leg 35.

The optical pick-off using a silicon sensor can be used to measure displacement, velocity, acceleration, or changes in pressure. As is known to those skilled in the art, acceleration is detected when proof mass 55 of sensor 53 moves within cavity 60, and thus relative to housing portions 59a, 59b. Because housing portions 59a, 59b are fixed with respect to second optical leg 35, movement of proof mass 55 within cavity 60 also is movement with respect to second optical leg 35. Such movement changes the width of the optical gap between reflective surface 64 of proof mass 55 and end surface 65 of second optical leg 35. The inner surface of first housing portion 59a is spaced a small distance from proof mass 55, to permit proof mass 55 to move in a single axis within cavity 60. The entire structure may be contained in a neutrally buoyant housing (not shown).

Figure 3:
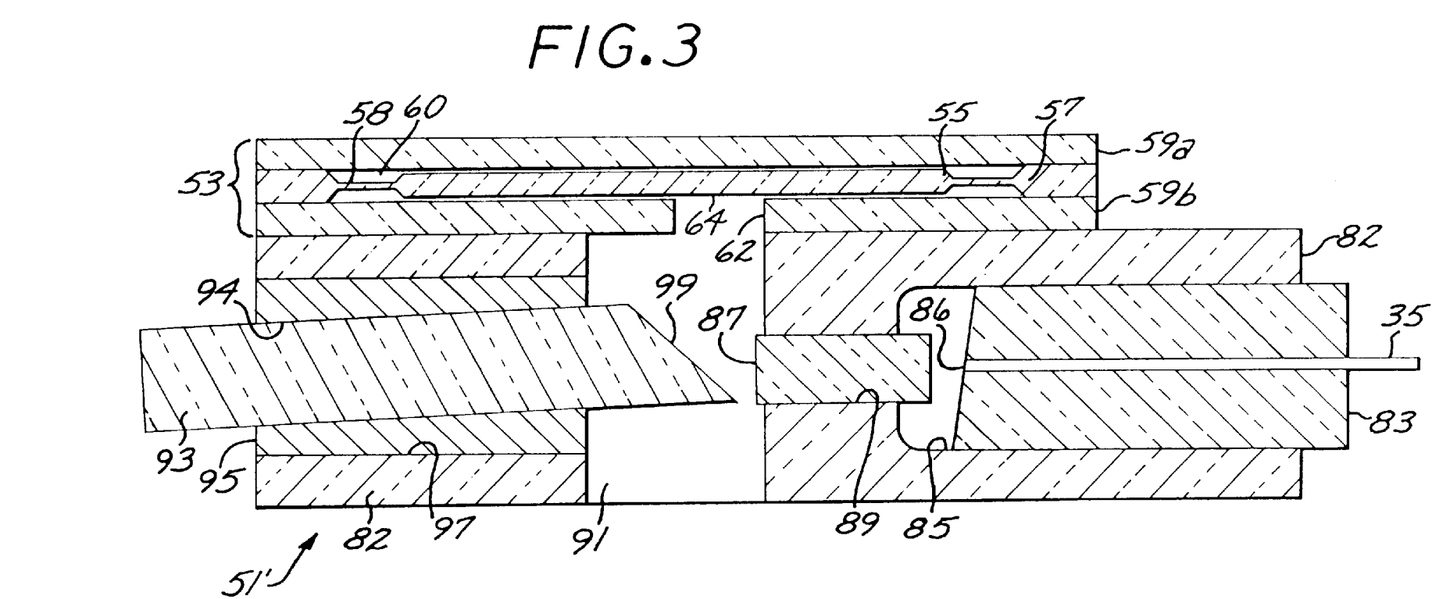
FIG. 3 is a cross-sectional view of the silicon sensor chip of FIG. 2A and a second embodiment of a supporting block for holding the sensor and the end portion of the optical fiber in an optical pick-off constructed according to the invention.

In FIG. 3, modified pick-off 51' having an alternative embodiment pick-off support block 82 is shown for use in applications in which a substantially flat structure for pick-off 51' is necessary or desired. Pick-off support block 82 receives the remote end of second optical leg 35 and provides an optical path for second optical beam between the end of second optical leg 35 and proof mass 55 of silicon sensor 53. Pick-off support block 82 is preferably formed of a disc-shaped piece of ceramic material, or a material of substantially equivalent thermal stability (i.e., low coefficient of thermal expansion), although its configuration and dimensions are largely matters of design choice, depending on the application.

The remote end portion of second optical leg 35 is contained in ferrule 83, which, like support block 82, should be formed of a material that has a negligible thermal coefficient of expansion such as a suitable ceramic. Ferrule 83 is inserted into first lateral bore 85 in support block 82 with sufficient clearance to allow ferrule 83 to be axially rotatable within bore 85 so that the orientation of the light beam may be adjusted for optimal operation. The ferrule 83 is also preferably installed in the bore so as to be axially movable therein. An axial passage through ferrule 83 holds the remote end portion of second optical fiber leg 35, which may terminate flush with the end of ferrule 83. Second optical fiber leg 35 has end face 86 that is preferably angled about eight degrees substantially to eliminate retro-reflection back into second optical fiber leg 35 without the need for an anti-reflective coating. For ease of manufacture, the end face of the ferrule 83 is similarly angled so as to be flush with the second fiber leg end face 86.

A cylindrical graded index lens (GRIN lens) 87 is optically aligned with end face 86 of second fiber leg 35 to focus a light beam emerging from second optical leg 35 onto reflective surface 64 of proof mass 55. There is preferably a gap of approximately 0.2 mm between end face 86 of second optical fiber leg 35 and the facing optical surface of GRIN lens 87. GRIN lens 87 is contained in second lateral bore 89 in support block 82 that is coaxial with first lateral bore 85.

Sensor 53 is mounted on the surface of support block 82 so that optical opening 62 in second sensor housing portion 59b is aligned with an air-filled optical passage 91 formed axially through support block 82. To accommodate ferrule 83, GRIN lens 87, and the components to be described below, passage 91 is not necessarily centered in block 82.

A mirror rod 93 is installed in eccentric bore 94 in tubular fitting 95 which, in turn, is installed for axial rotation in third lateral bore 97 in support block 82. The inner end of mirror rod 93 terminates in mirrored surface 99 that protrudes into passage 91 to receive a light beam emerging from GRIN lens 87, and which rod 93 is cut at a 45 degree angle. The second optical beam emerging from end 86 of second optical fiber leg 35 propagates through GRIN lens 87, is reflected at a 90 degree angle by mirrored surface 99 on the end of mirror rod 93, and then propagates through passage 91. Tubular fitting 95 is rotatable within third lateral bore 97 so that the impingement point of the light beam on mirrored surface 99 may be adjusted for optimal operation, i.e., to minimize losses and unwanted reflections. An additional degree of adjustability may be obtained by installing mirror rod 93 in tubular fitting 95 so as to be axially rotatable within eccentric bore 94.

Optical opening 62 in second sensor housing portion 59b is aligned so that the light path does not pass through the housing material. Since optical opening 62 registers with passage 91 in pick-off support block 82, the second optical beam propagates only through air once it exits GRIN lens 87. Thus, the second optical beam propagating through second optical fiber leg 35 emerges from end 86 of the fiber, passes through the air gap between fiber end 86 and GRIN lens 87, and enters GRIN lens 87. GRIN lens 87 images the light beam from fiber end 86 onto reflective surface 64 of proof mass 55. Mirrored surface 99 reflects the beam ninety degrees, causing the light beam to pass through opening 62 in second housing portion 59b of sensor 53, so as to impinge on reflective surface 64 of proof mass 55. Reflective surface 64 reflects the light beam back toward mirrored surface 99. Mirrored surface 99 reflects the reflected beam ninety degrees back into GRIN lens 87. The reflected beam then passes through GRIN lens 87 and re-enters second optical fiber leg 35. Efficient coupling of the light beam from fiber 35 to proof mass surface 54 and back is important to obtain maximum effectiveness of the device. There should be minimal back reflections at fiber end 86 or elsewhere.

Mirrored surface 99 should be adjusted so that the reflected light from reflective surface 64 propagates exactly along the same path as the beam impinging on reflective surface 64. Thus, mirrored surface 99 should direct the beam as close to center of proof mass 55 as possible if proof mass 55 flexes at all during use.

Figure 4:
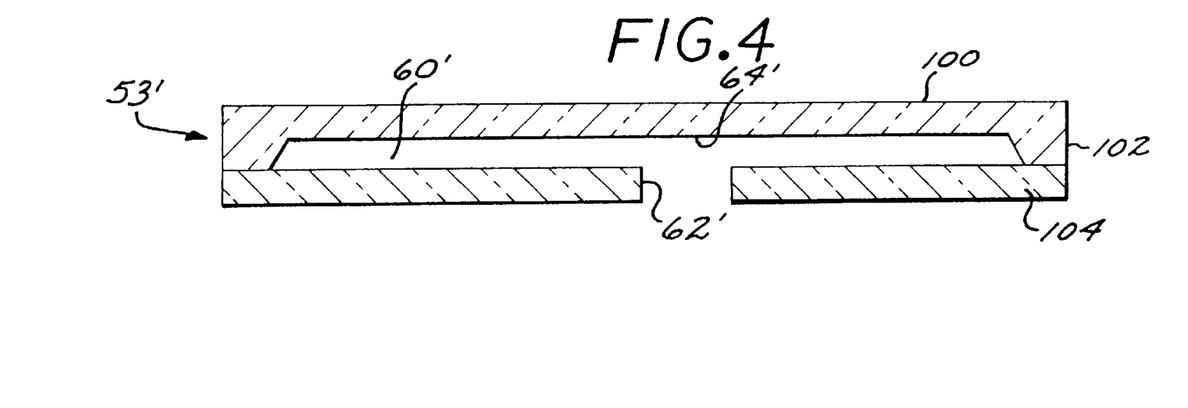
FIG. 4 is a cross-sectional view of an alternative embodiment of a silicon sensor chip that may be used in the present invention.

For applications in which changes in the environmental pressure are to be measured (such as a hydrophone system), the structure of the sensor may differ from that shown in FIGS. 2A, 2B, 2C and 3. As is understood by those skilled in the art, in such an application proof mass structure 55, 58 shown in the drawings would be omitted. The structure of such an alternative embodiment sensor 53' is shown in FIG. 4. In this variation, sensor 53' includes silicon diaphragm 100 instead of a proof mass, having a flexible central area that flexes in response to changes in environmental pressure. Diaphragm 100 is surrounded by peripheral rim 102 that is attached to rigid base plate 104, forming internal optical cavity 60' between diaphragm 100 and base plate 104. Base plate 104 has optical opening 62' for the passage of the second optical beam, which strikes reflective surface 64' that is applied directly to the interior surface (which faces cavity 60') of diaphragm 100. Pressure changes cause the central area of diaphragm 100 to move, changing the path length of the optical gap defined by the width of internal cavity 60'.

In a preferred embodiment of the present invention, the optical beams are recombined and processed as follows: In FIG. 1, the second optical beam reflected from pick-off 51 is propagated back in a second direction through second optical fiber leg 35, while the first optical beam, reflected from fixed end mirror 41, is propagated back in a second direction through first optical fiber leg 33. The first and second optical beams are recombined in second optical coupler 38 so as to form an interference signal that changes with the motion of the movable mirror of pick-off 51 in response to changes in the value of the environmental parameter. The interference signal is propagated through down-link 36 and coupled to transmission line 15 by first optical coupler 37. The interference signal is propagated through transmission line 15 and is transmitted to photo detector 39 by means of optical fiber link 75 coupled to the transmission line by optical coupler 73.

Because the second optical beam reflected from pick-off 51 has traveled a different length than has the first optical beam reflected from end mirror 41, the light reflected from pick-off 51 interferes with the light reflected from end mirror 41, creating an interference pattern that changes as proof mass 55 moves in response to the changes in the environmental parameter. The interference pattern changes manifest themselves in changes in the value of the interference signal detected by photo detector 39, which generates an electrical output signal having a value that indicates the changes in the interference signal value. This electrical output signal is input to microcomputer 77, after suitable and conventional signal conditioning and digitizing, that processes the electrical signal by means known in the art to correlate changes in the value of the interference signal with changes in the value of the environmental parameter, thereby yielding measurements indicative of changes in the value of the parameter.

When the present invention is used as an accelerometer, movement of the body to which optical pick-off 51 is attached causes proof mass 55 contained in housing 59a, 59b to move within sensor cavity 60. That movement of proof mass 55 changes the length of the optical path for the light propagating through second leg 35. Thus, changing the length of the optical path between the housing and the proof mass, in turn, changes the interference pattern in the reflected interference signal that is detected by photo detector 39. From such changes in the interference pattern in the reflected light, the movement of proof mass 55 can be determined.

The present invention may also be used as a pressure sensor, as in a hydrophone, preferably employing sensor 53' shown in FIG. 4. Changes in pressure, such as sound waves passing over pick-off 51, cause the flexible diaphragm 100 to flex, changing the length of the optical path for the light propagating through second leg 35. Thus, changing the length of the optical path changes the interference pattern in the reflected interference signal that is detected by photo detector 39. From such changes in the interference pattern in the reflected light, environmental pressure changes can be measured. From such measured pressure changes, information about sound waves causing those changes can be obtained.

In an application such as in a seismic array, a large number of the present invention interferometers employing sensors 53' as shown in FIG. 4 may be arranged and towed behind a vessel or be embedded in the ground. With sufficient laser source power, dozens of these devices can be driven by one laser. With distributed gain from erbium doping in selected portions of the optical fiber, hundreds of these devices can be driven by one pump and one signal laser.

Unlike the prior art, the optical fiber components in the present invention do not perform a sensor function. Sensing is preferably performed through silicon sensor 53 of pick-off 51. For sensing environmental changes having a frequency above a few tenths of one Hertz, phase delays in optical fiber legs 33, 35 due to fiber stretching are negligible.

A phase generated carrier necessary for the described system requires a sufficient optical path length mismatch between the two fiber legs 33, 35. Current state of the art with respect to passive fiber optic sensor architectures dictates an optical path length mismatch between first and second fiber legs 33, 35 that should be about 10 centimeters to about 1 meter. Such an optical path length mismatch is also compatible with current state of the art stable narrow line width laser sources and fiber optic architectures using internal frequency modulation and time division multiplexing or external phase modulation and frequency division multiplexing.

Optical pick-off 51 measures the displacement of proof mass 55 with respect to the fixed silicon sensor housing 59a, 59b at frequencies above some minimum around one to five Hertz. While the optical path lengths within fiber legs 33, 35 may slowly drift over time and temperature, such changes cause errors so low in frequency that they can be ignored for the purposes of making measurements with the requisite degree of accuracy. For example, a one degree Celsius change in temperature in one minute may produce fringe motion corresponding to 0.1 Hz, far below the above-mentioned minimum, when the difference between the two fiber legs 33, 35 is approximately one meter.

For use as an accelerometer, proof mass 55 of a given optical pick-off 51 has a response in one direction only. Three interferometric sensors, each containing its own silicon sensor chip, may be used to measure motion in the three axes x, y, and z. A triad of such sensors may be mounted on one block.

As introduced earlier, FIG. 1 shows an exemplary embodiment system incorporating three sensors, such as might be used for measuring velocity or acceleration in three directions. The second and third interferometers 101, 121 used as accelerometers each are substantially identical to interferometer 31, although they may be either the embodiment of FIG. 2A or that of FIG. 3. It is not necessary for all the interferometers in a particular system to be of the same embodiment, nor is the system limited to any particular number of interferometers.

In FIG. 1, second interferometer 101 contains unequal length fiber legs 103, 105. One fiber leg 103 is substantially shorter than the other fiber leg 105, the two legs being optically coupled by optical coupler 106. Shorter leg 103 terminates in fixed end mirror 107. Longer leg 105 terminates in optical pick-off 109 that is advantageously substantially identical to either to optical pick-off 51 or optical pick-off 51' described above. The second interferometer is coupled to transmission line 15 by fiber optic down-link 111 and optical coupler 113. Similarly, third interferometer 121 contains unequal length fiber legs 123, 125, joined by optical coupler 126. First fiber leg 123 is substantially shorter than second fiber leg 125. Shorter leg 123 terminates in fixed end mirror 127. Longer leg 125 terminates in optical pick-off 129. Third interferometer 121 is optically coupled to transmission line 15 by fiber optic down-link 131 and optical coupler 133. Additional interferometers of the same construction may be added to the system by optically coupling them to main transmission line 15.

Figure 5:
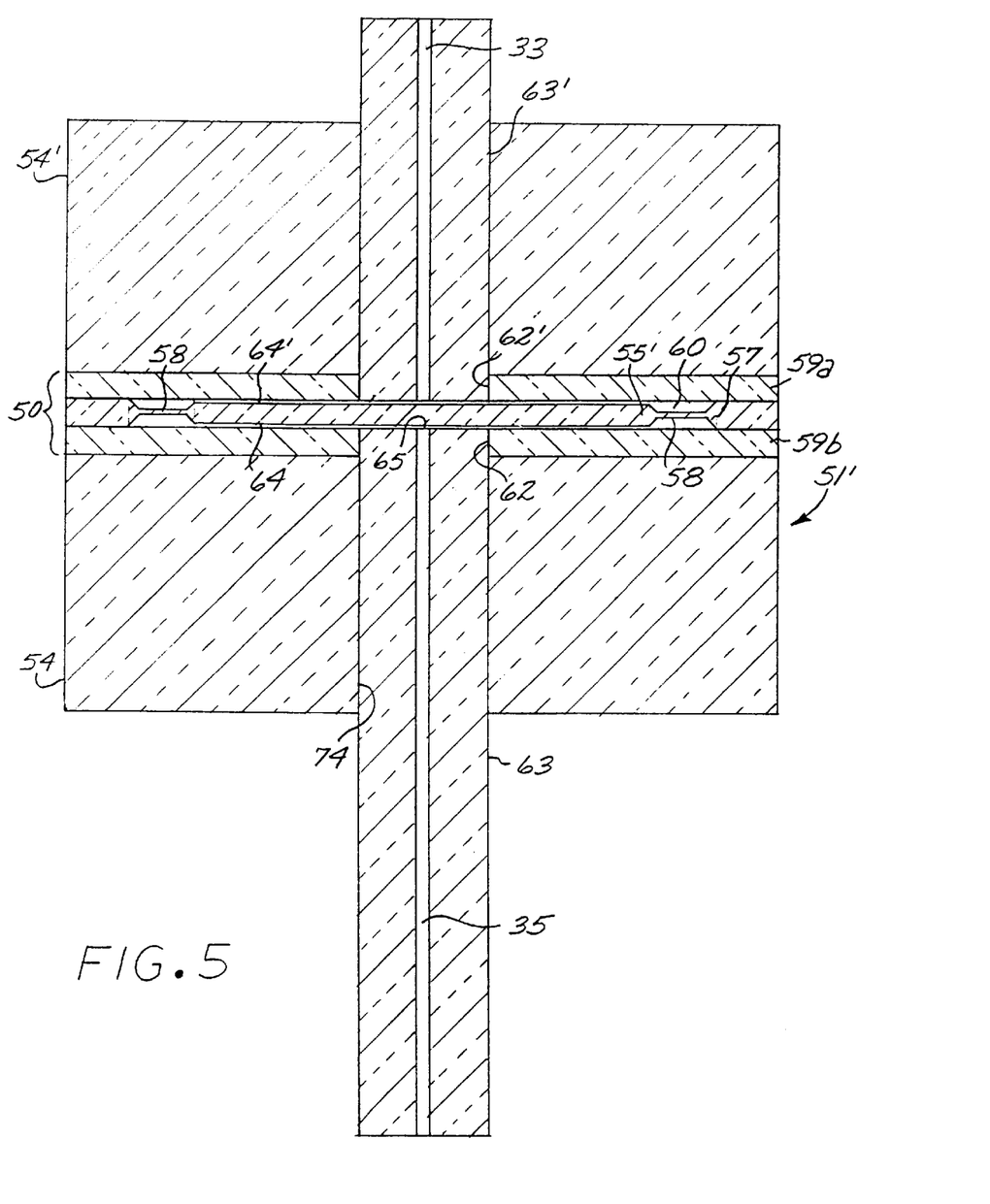
FIG. 5 is a cross-sectional view of another alternative embodiment silicon sensor having two opposed optical fibers in an optical pick-off constructed in a push-pull configuration.

FIG. 5 provides a cross-sectional view of an alternative embodiment silicon sensor chip 50 having two opposed optical fibers forming optical pick-off 51'. The arrangement is similar to the construction depicted in FIG. 2 with a single optical signal source that is split into two active legs, except that ferrule 63' has been added and passes through opening 62' in second housing portion 59a of silicon sensor 50. First optical fiber leg 33 has now been redirected through ferrule 63' so that it terminates at the opposite side of proof mass 55'. Ferrule 63' is held in place by support block 54'. Similar to the arrangement of second optical leg 35, first optical leg 33 is directed to proof mass 55'. This side of proof mass 55' also has a highly polished surface 64' to reflect the light beam back into first optical leg 33. In all other respects, the gap width, coating, finishes, construction, and relationship of first optical leg 33 to proof mass 55' are similar to that of second optical leg 35 described in detail above. Furthermore, the beams from each optical leg 33, 35 are recombined and processed as described above.

In this "push-pull" configuration of FIG. 5, both optical legs are active, creating a built-in common mode rejection capability. Such a capability can be applied to a displacement, velocity, or acceleration sensors, for example, where each optical leg may sense movement in the sensor housing containing the proof mass, thus giving an indication of environmental motion or activity.

Figure 6:
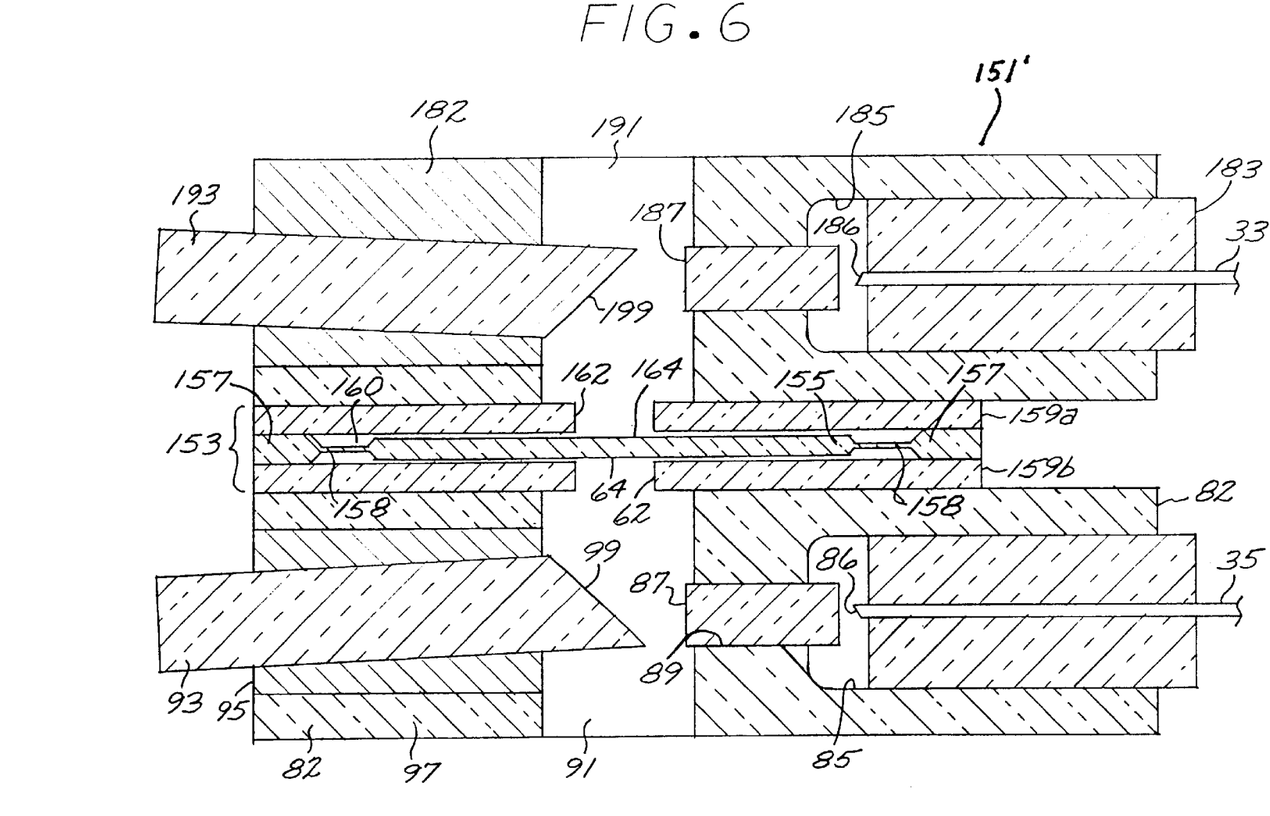
FIG. 6 is a cross-sectional view of another alternative embodiment sensor having two opposed optical fibers similar to the embodiment shown in FIG. 5.

FIG. 6 is yet another alternative embodiment of the "push-pull" pick-off 151' configuration of the present invention, and is a modification of the embodiment shown in FIG. 3 with the addition of the surrounding structures to direct the optical signal from first optical leg 33 to and from proof mass 155. In fact, FIG. 6 shows the surrounding structures on one side of silicon sensor 153 as a mirror image of the surrounding structures on the other side. Similar to the exemplary embodiment shown in FIG. 3, silicon sensor 153 has proof mass 155 suspended by hinges or flexible connecting portions 158 at opposite edges and moves within cavity 160. Mounting portion 157 of the substrate surrounding proof mass 155 is fixed between first housing portion 159a and second housing portion 159b.

As mentioned above, the surrounding structure on both sides of sensor 153 are mirror images, and the structure just below sensor 153 in FIG. 6 has been described in detail in connection with FIG. 3. In FIG. 6, the added structures are needed to direct the first optical beam to and from proof mass 155. Specifically, the first optical beam passing through first optical fiber leg 33 emerges from the fiber's end face 186, and is redirected by mirrored surface 199 toward reflective surface 164 of the moving proof mass 155. Reflective surface 164 reflects the light beam back along the same path into first optical fiber leg 33.

As seen in FIG. 6, ferrule 183 holds the remote end of first optical leg 33, with ferrule 183 itself being held in lateral bore 185 within support block 182. A cylindrical graded index lens (GRIN lens) 187 is optically aligned with end face 186 of first fiber optic leg 33 to focus the beam to mirrored surface 199 and eventually to reflective surface 164. Optical opening 162 is provided in first housing portion 159a and passage 191 is provided in support block 182 for passage of the beam to and from reflective surface 164. The beams from each optical leg 33, 35 are recombined and processed as described above.

Figure 7:
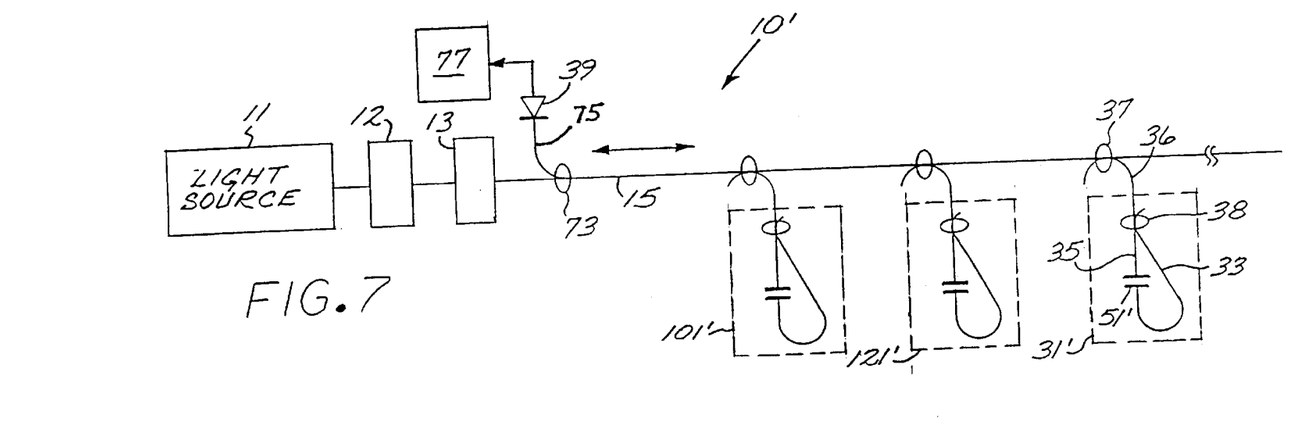
FIG. 7 is a schematic showing a preferred embodiment measuring device constructed similar to that shown in FIG. 1, except that the sensors have optical pick-offs in the push-pull configuration.

FIG. 7 is a schematic showing a preferred embodiment measuring device constructed similar to that shown in FIG. 1, except that the sensors have optical pick-offs in the push-pull configuration described in connection with FIGS. 5 and 6. In particular, measuring system 10' includes light source 11, amplitude modulator 12, and phase modulator 13 propagating an optical signal through transmission line 15 to three identical interferometers 101', 121', and 31'.

As with the other two interferometers, first interferometer 31' is optically coupled to transmission line 15 by fiber optic down-link 36 and first optical coupler 37. First interferometer 31 comprises first and second fiber optic legs 33, 35 propagating two interrogation beams generated by second optical coupler 38, which split the incoming optical signal from down-link 36. First and second fiber optic legs 33, 35 direct the two active interrogation beams to opposite sides of optical pick-off 51'. Further details of optical pick-off 51' are described above in connection with FIG. 5.

For the return trip, the reflected optical signals from optical pick-off 51' are transmitted through legs 33, 35 and recombined in second optical coupler 38 to form an interference signal, which signal is propagated through transmission line 15 to photo detector 39 via optical fiber link 75 coupled to transmission line 15 by optical coupler 73. Photo detector 39 converts the optical interference signal into an electrical output signal that is analyzed by microcomputer 77.

As described above, the present invention can be applied in a displacement sensor, a velocity sensor, or an accelerometer. A proper selection of proof mass dimensions, gaps between the proof mass and the surrounding substrate, mass of the proof mass, the natural frequency of the suspension system, and fluid viscosity filling the gaps would yield the sensor of choice.

Empirical studies have shown that for measuring displacement, velocity, or acceleration, the mass and proportions of the proof mass influence the signal-to-noise ratio of the output signal. Within the context of a seismic sensor where ten or more sensors might be loaded on a transmission line similar to that shown in FIG. 1, it is preferable to have the output signal from the present invention be sufficiently large in magnitude to be discernible over optical and electrical noise, and yet still operate within a useful frequency range of, for instance, 10 to 500 Hz.

Moreover, empirical studies indicate that to measure displacement, the sensor should preferably have a proof mass of 1 to 3 grams in mass with an area in the order of 14 mm by 14 mm. To measure velocity, the sensor should preferably have a proof mass of 0.05 to 2 grams in mass with an area of 12 mm by 12 mm. To measure acceleration, the sensor should preferably have a proof mass of 0.05 to 0.25 grams in mass with an area of 6 mm by 6 mm.

In addition, in the preferred embodiment, the proof mass in the velocity and acceleration sensor should be suspended in a medium such as air or nitrogen gas, having a viscosity of 0.00018 dyne-sec/cm$^2$. The proof mass in the displacement sensor should be suspended in an oil having a viscosity in the order of 0.16 dyne-sec/cm$^2$. A proof mass of such proportions with surrounding frame or support structure can be constructed from a flat silicon wafer of, for example, 400 microns in thickness which is then etched by laser, gas, photolithography, or the like.

For seismic measurements, and assuming all other factors being equal, a displacement sensor has good performance bandwidth, better than a velocity sensor, but requires a large gap and highly viscous fluids for damping. The sensor must be large and bulky. An accelerometer has a very narrow usable bandwidth. A velocity sensor has better bandwidth than an accelerometer, with smaller gaps than in a displacement sensor, and operates in air. Therefore, a velocity sensor would appear to be more versatile than an accelerometer or a displacement sensor for seismic applications.

The present invention velocity sensor is constructed based on an approach of selecting the appropriate proof mass, damping fluid, etc., to diminish the acceleration and displacement components. To see this, a starting point is with the standard expression for the motion of a proof mass in an open loop system:

$$M\ddot{x}+C(f)\dot{x}+K(f)x=-M\dot{v}+T$$

where:

x=displacement of the proof mass relative to the mass housing $\dot{x}$=velocity of the proof mass $\ddot{x}$=acceleration of the proof mass M=mass of the proof mass C(f)=damping factor of the system K(f)=spring constant v=housing velocity T is the applied force required to hold the proof mass at null; in other words, it is the force needed to rebalance the proof mass. In an open loop system, T=0.

The mass M and the spring constant K are selected so that the damping factor C is much larger than the square root of the product of K and M. Thus, the acceleration and displacement terms may be ignored in the equation. Then dividing through the equation by C leaves:

velocity $\dot{x} \approx -(M/C)\dot{v}$ or $x -(M/C)v$ assuming $C >> (KM)^{1/2}$ where $K \neq 0$ and $M \neq 0$.

Hence, an open loop velocity sensor for seismic applications can be constructed using the above formula. An exemplary embodiment velocity sensor could be constructed based on the following ranges in the band of interest:

The mass is $0.050 < M < 0.250$ gm.

The spring rate is $100,000 < K < 5,000,000$ dyne/cm.

The damping factor is $10,000 < C < 60,000$ dyne/(cm/sec).

The foregoing velocity sensor can be adapted for use with the optical pick-off described above. It is also contemplated that the present invention velocity sensor can be adapted for use with an electrostatic pick-off.

The present invention interferometric system can further be adapted for use with a silicon chip sensor of a much smaller scale. An example of such a silicon microstructure chip sensor is disclosed in U.S. Pat. No. 5,503,285 to Warren, the entire contents of which are hereby incorporated by reference.

Although several preferred embodiments have been described herein, such embodiments are exemplary only. A number of variations and modifications may suggest themselves to those skilled in the pertinent arts. For example, the configuration and dimensions of support blocks 54 (FIGS. 2 and 5) and 82 (FIG. 3) may be varied to suit different applications. Also, the above-described alignment adjustment mechanism for mirror rod 93 in the FIG. 3 embodiment may be modified to be adjustable in additional directions, or it may be omitted altogether. These and other variations and modifications are considered within the spirit and scope of the present invention as defined in the following claims.

What is claimed is:

1. A system for sensing changes in a value of an environmental parameter, comprising:
    a coherent optical signal source;
    an interferometer optically coupled to the optical source to receive a pulsed optical signal therefrom, the interferometer including
        a first optical coupler splitting the optical signal into first and second beams;
        the first and second beams traversing first and second optical legs, respectively, wherein an optical path length through one of the optical legs is longer than an optical path length through the other optical leg;
        a first mirror terminating the first optical leg to reflect the first beam back into the first optical leg;
        a proof mass suspended on a frame in a cavity including a fluid, wherein the proof mass is movable in response to a change in the value of the parameter, the proof mass further including a reflective surface forming a second mirror, wherein the second mirror terminating the second optical leg to reflect the second beam back into the second optical leg;
        a second optical coupler recombining the first and second beams after their reflection back along their respective optical legs by the first and second mirrors to form an interference pattern;
        an optical detector responsive to the interference pattern, and generating an electrical signal indicative of the value of the interference pattern; and
        a processor responsive to the electrical signal, correlating a change in the value of the interference signal with a change in the value of the parameter.

2. The system of claim 1, wherein the first mirror is mounted to the frame.

3. The system of claim 1, wherein the proof mass has a first side and a second side, and the first and second mirrors are disposed on the first and second side of the proof mass, and wherein the first mirror terminating the first optical leg to reflect the first beam back into the first optical leg, and the second mirror terminating the second optical leg to reflect the second beam back into the second optical leg.

4. The system of claim 1, wherein the first and second optical legs include a fiber optic cable.

5. The system of claim 1, wherein the frame further comprises first and second housing portions defining a cavity in which the proof mass is supported for movement, the second housing portion having an optical opening for the passage of the second beam for reflection from the second mirror.

6. The system of claim 5, wherein the proof mass is suspended at opposite ends to the housing portions.

7. The system of claim 1, wherein the proof mass has a mass of 0.5 to 3.5 grams for measuring displacement.

8. The system of claim 1, wherein the proof mass has a mass of 0.05 to 0.250 grams for measuring velocity.

9. The system of claim 1, wherein the proof mass has a mass of 0.005 to 0.25 grams for measuring acceleration.

10. The system of claim 1, wherein the proof mass has a polygonal shape with vertices and is attached to the frame at the vertices.

11. The system of claim 1, wherein the frame and proof mass include a silicon material.

12. The system of claim 1, wherein the fluid is selected from the group consisting of a gas, a liquid, an emulsion, or a gel.

13. An interferometric sensing system comprising:
    a sensor including a proof mass having opposite ends and a surrounding frame, wherein the proof mass is suspended on the frame by a hinge at the opposite ends, wherein the frame includes an optical path;
    a coherent light source;
    a first optical coupler receiving the light source and splitting the optical signal into first and second beams;
    the first and second beams traversing first and second optical legs, respectively, wherein an optical path length through one of the optical legs is longer than an optical path length through the other optical leg;
    a first mirror terminating the first optical leg to reflect the first beam back into the first optical leg, the first mirror disposed on the sensor;
    a second mirror terminating the second optical leg to reflect the second beam back into the second optical leg, the second mirror disposed on the proof mass such that the second optical leg passes through the optical path in the frame;
    a second optical coupler recombining the first and second beams after their reflection back along their respective optical legs by the first and second mirrors to form an interference pattern;
    an optical detector responsive to the interference pattern, and generating an electrical signal indicative of the value of the interference pattern; and
    a processor responsive to the electrical signal, correlating a change in the value of the interference signal with a change in the value of the parameter.

14. The system of claim 13, wherein the frame includes two optical paths, and the first mirror terminating the first optical leg is disposed on the proof mass.

15. The system of claim 13, wherein polygonal shape with vertices and is attached to the frame at the vertices.

16. The system of claim 13, wherein the proof mass has an asymmetrical profile.

17. A method of measuring changes in an environmental parameter comprising the steps of:

providing a proof mass suspended on a frame by hinges at opposite ends, wherein the proof mass is located in between the hinges;

providing a coherent optical signal;

providing an interferometer having a fixed mirror and a movable mirror that is movable in response to changes in the value of the environmental parameter;

positioning the movable mirror on the proof mass and the fixed mirror on the frame;

directing the optical signal into the interferometer to obtain an interference signal as an output from the interferometer, the interferometer signal having a value that varies in response to the motion of the movable mirror;

detecting the variations in the interference signal value; and correlating the interference signal value variations with changes in the value of the environmental parameter.

18. The method of claim 17, wherein the proof mass includes an asymmetrical profile.

19. The method of claim 17, wherein the method further comprises the step of suspending the proof mass in a gas.

20. The method of claim 17, wherein the method further comprises the step of suspending the proof mass in a fluid.

21. A sensor comprising:

a frame;

a proof mass having a mass M, wherein the proof mass may be displaced a distance X in a single direction;

a damping fluid having a damping factor C enveloping the proof mass;

a hinge connecting the proof mass to the frame, wherein the hinge has a spring constant K, and wherein C is much greater than a square root of a product of K and M to obtain a velocity sensor, and wherein K and M are not equal to zero; and a pick-off disposed adjacent the proof mass.

22. The sensor of claim 21, wherein the pick-off includes an optical pick-off.

23. The sensor of claim 21, wherein the pick-off includes an electrostatic pick-off.

24. The sensor of claim 22, wherein the proof mass includes a polygonal shape having vertices, and the sensor includes a plurality of hinges that connect the vertices to the frame.

25. The sensor of claim 22, wherein the proof mass includes a four sided polygon having four vertices, and a hinge connected at each vertex.

26. The sensor of claim 21, wherein M is 0.05 to 2 grams to achieve a velocity sensor.

27. The sensor of claim 21, wherein the proof mass has an asymmetrical profile.

28. A sensor comprising:

a frame having an optical path;

a proof mass having a mass M with an area defined by opposed edges, wherein the proof mass may be displaced a distance X in a single direction;

a damping fluid having a damping factor C enveloping the proof mass;

at least two hinges connecting the proof mass to the frame at the opposed edges, wherein the hinges have a spring constant K;

a coherent light source;

a first optical coupler receiving the light source and splitting the optical signal into first and second beams;

the first and second beams traversing first and second optical legs, respectively, wherein an optical path length through one of the optical legs is longer than an optical path length through the other optical leg;

a first mirror terminating the first optical leg to reflect the first beam back into the first optical leg, the first mirror disposed on the sensor;

a second mirror terminating the second optical leg to reflect the second beam back into the second optical leg, the second mirror disposed on the proof mass such that the second optical leg passes through the optical path in the frame;

a second optical coupler recombining the first and second beams after their reflection back along their respective optical legs by the first and second mirrors to form an interference pattern;

an optical detector responsive to the interference pattern, and generating an electrical signal indicative of the value of the interference pattern.

29. The sensor of claim 28, wherein C is much greater than a square root of a product of K and M to obtain a velocity sensor, and wherein K and M are not equal to zero.

30. The sensor of claim 28, wherein the proof mass has a polygonal shape with vertices, and the hinges connect the vertices to the frame.

* * * * *

UNITED STATES PATENT AND TRADEMARK OFFICE
CERTIFICATE OF CORRECTION

PATENT NO.     : 6,064,630
DATED          : May 16, 2000
INVENTOR(S)    : Samuel N. Fersht and David B. Hall It is certified that error appears in the above-identified patent and that said Letters Patent is hereby corrected as shown below:

<u>Title page,</u>
Item [56], References Cited, after listing of FOREIGN PATENT DOCUMENTS, add new heading -- OTHER PUBLICATIONS --, followed by: -- E. Udd, Fiber Optic Sensors, An Introduction for Engineers and Scientists, pp. 347-363, 1991, *Distributed and Multiplexed Fiber Optic Sensors.* --.

Signed and Sealed this

Second Day of July, 2002

*Attest:*

*Attesting Officer*

JAMES E. ROGAN
*Director of the United States Patent and Trademark Office*